United States Patent [19]

Hatakeyama et al.

[11] Patent Number: 6,107,384

[45] Date of Patent: Aug. 22, 2000

[54] SILICA-BLENDED RUBBER COMPOSITION AND PRODUCTION PROCESS FOR THE SAME

[75] Inventors: Kazuya Hatakeyama; Kazuaki Someno, both of Kodaira, Japan

[73] Assignee: Bridgestone Corporation, Tokyo, Japan

[21] Appl. No.: 09/270,517

[22] Filed: Mar. 17, 1999

[30] Foreign Application Priority Data

Mar. 20, 1998 [JP] Japan .................................. 10-072608

[51] Int. Cl.$^7$ ................................ C08K 3/38; C08K 3/36; C08K 3/34; C08K 3/30

[52] U.S. Cl. .......................... 524/405; 524/571; 524/574; 524/575.5; 524/492; 524/262; 525/342; 525/343; 152/209.1; 152/905

[58] Field of Search ...................... 524/571, 574, 524/575.5, 405, 492, 262; 525/342, 343, 346; 152/209.1, 905

[56] References Cited

U.S. PATENT DOCUMENTS

| | | | |
|---|---|---|---|
| 4,569,382 | 2/1986 | Maxey et al. ............................ | 152/548 |
| 4,654,271 | 3/1987 | Mauer et al. ............................ | 428/465 |
| 5,534,574 | 7/1996 | Sandstrom et al. ..................... | 524/262 |
| 5,534,599 | 7/1996 | Sandstrom et al. ..................... | 525/342 |

FOREIGN PATENT DOCUMENTS

| | | | |
|---|---|---|---|
| 197 26 728 A1 | of 0000 | Germany . | |
| 8-259736 | of 0000 | Japan . | |
| 9-118784 | of 0000 | Japan . | |
| 9-216968 | of 0000 | Japan . | |

OTHER PUBLICATIONS

Maity, S.K., et al., "Studies on curing characteristics of natural rubber–nitrile, rubber–, and silicone rubber–based filled compounds in the presence of boron compounds", *Angewandte Mackromoleculare Chemie. Applied Macromolecular Chemistry and Physics,* vol. 221, pp. 11–31, Oct. 1, 1994.

*Primary Examiner*—Robert Dawson
*Assistant Examiner*—Kuo-Liang Peng
*Attorney, Agent, or Firm*—Sughrue, Mion, Zinn, Macpeak & Seas, PLLC

[57] ABSTRACT

A silica-blended rubber composition comprising 100 parts by weight of sulfur-vulcanizable rubber blended with 10 to 100 parts by weight of silica, 3 to 20% by weight of a silane coupling agent based on the silica and 1 to 20% by weight of sodium borate based on the silica. An alkoxy group-containing silane coupling agent is preferred as the silane coupling agent, and sodium tetraborate is preferred as the sodium borate.

5 Claims, No Drawings

SILICA-BLENDED RUBBER COMPOSITION AND PRODUCTION PROCESS FOR THE SAME

BACKGROUND OF THE INVENTION

1. Field of the Invention

The present invention relates to a rubber composition containing silica and a silane coupling agent, more specifically to a rubber composition blended with silica capable of improving a rate of the reaction between silica and a silane coupling agent and improving a stability of rubber at a processing step.

2. Description of the Related Art

In recent years, low fuel consumption is strongly requested to be compatible with wet grip for a tread part of a tire. In order to solve this, it is rapidly increasing to use a rubber composition blended with silica for a tread.

While this rubber composition blended with silica for a tire tread has the advantage described above, disadvantages of a degradation in the processability and an increase in the cost come out as the blending amount of silica increases.

In general, silica has a poor affinity with polymers and is inferior in a reinforcing property. In addition thereto, since the dispersion becomes poor, the Mooney viscosity value is increased and hence the extrusion processability is deteriorated. Accordingly, a silane coupling agent is used to solve the problems of improving the dispersibility and the processability (Japanese Patent Application Laid-Open No. Hei 8-259736).

However, the existing situation is that since a silane coupling agent has a small efficiency of coupling action, an increased amount thereof is blended in order to make up for it. Further, there is a problem in that since a coupling agent is expensive, an increased blending amount of the coupling agent leads to a large increase in the cost.

A silane coupling agent containing an alkoxy group is disclosed in Japanese Patent Application Laid-Open No. Hei 8-259736. Silica is reacted with an alkoxy group-containing silane coupling agent during kneading to produce alcohol as a byproduct. Usually, the reaction is not completed and further goes on during the subsequent extrusion processing to produce alcohol. Thus, bubbles and blisters formed by allowing bubbles to grow into cavities are produced, so that a dimensional stability is damaged or the processing speed is obliged to be lowered in order to inhibit the blisters from being produced.

If the temperature in the kneading is elevated, the reaction shall be more accelerated. However, if the temperature is elevated too much, another inconvenience such as gelation is caused by vulcanization due to sulfur originating from a coupling agent at the same time as the reaction goes on, and therefore there is a limit for elevating the temperature.

If the blending amount of a coupling agent is reduced in order to decrease the production of alcohol, caused are inconveniences such as an increase in the viscosity and a reduction in the reinforcing property due to poor dispersion of silica.

Further, disclosed in Japanese Patent Application Laid-Open No. Hei 9-118784 (U.S. Pat. No. 5,616,655) is a processing method of a rubber composition characterized by mechanically mixing a rubber composition comprising 100 parts by weight of a sulfur-curing elastomer, 10 to 250 parts by weight of fine particulate precipitated silica, an organic silicon compound (silane coupling agent) having a specific structure of 0.01 to 1.0 part by weight per part by weight of said silica, and 10 to 250 parts by weight of sodium thiosulfate.pentahydrate ($Na_2S_2O_3 \cdot 5H_2O$) at a rubber temperature falling in the range of 140 to 190° C. for 1 to 20 minutes.

The technology disclosed in this publication is a technology close to that of the present invention, and the object thereof is to improve a coupling efficiency of a silane coupling agent by adding sodium thiosulfate.pentahydrate to shorten the blending/processing time at a so-called nonproductive mixing step without sacrificing the properties of the finished product. In this method, an increase in the viscosity and a reduction in the scorch (prevulcanization of rubber) time are notably observed, and therefore it is not suited to practical use.

On the other hand, disclosed are a rubber component blended with an inorganic salt hydrate in Japanese Patent Application Laid-Open No. Hei 9-216968 and compositions blended with boric acid compounds in EP-A065476 and EP-A208505. However, all of these Patent Applications are to improve the adhesive properties and relate to compositions containing no silica-silane coupling agent.

Further, tin (Sn) compounds such as a tin salt of fatty acid are known as a curing catalyst for silicone rubber. However, such Sn compounds accelerate not only a reaction between silica and a silane coupling agent but also an unpreferable reaction between silane coupling agents themselves. Accordingly, bonds between the polymers and between the silicas are produced to elevate the viscosity of the rubber, and therefore they are not suited to practical use after all.

SUMMARY OF THE INVENTION

An object of the present invention is to improve a rate of the reaction between silica and a silane coupling agent used for a silica-blended rubber composition and prevent bubbles and blisters from being produced in a coupling reaction to improve a dimensional stability of the rubber product and to accelerate the speed of extrusion processing.

Intensive investigations made by the present inventors in order to achieve the object described above have resulted in finding that a specific amount of a specific compound blended in a rubber composition containing silica and a silane coupling agent improves a rate of the reaction between the silica and the silane coupling agent and can prevent blisters from being produced during extrusion processing, and thus the present invention has come to be completed.

The present invention relates to the following silica-blended rubber composition and production process for the same.

(1) A silica-blended rubber composition comprising 100 parts by weight of sulfur-vulcanizable rubber blended with 10 to 100 parts by weight of silica, 3 to 20% by weight of a silane coupling agent based on the silica and 1 to 20% by weight of sodium borate based on the silica.

(2) The silica-blended rubber composition as described in the above item (1), wherein sodium borate is sodium tetraborate.

(3) The silica-blended rubber composition as described in the above item (1) or (2), wherein the silane coupling agent is a silane coupling agent having an alkoxy group.

(4) The silica-blended rubber composition as described in the above item (3), wherein the alkoxy group is an ethoxy group.

(5) The silica-blended rubber composition as described in any of the above items (1) to (4), wherein the silane coupling agent is bis-(3-triethoxysilylpropyl)polysulfide.

(6) A production process for a silica-blended rubber composition, comprising a step of blending:
① sulfur-vulcanizable rubber,
② 10 to 100 parts by weight of silica per 100 parts by weight of the rubber,
③ 3 to 20% by weight of a silane coupling agent based on the silica, and
④ 1 to 20% by weight of sodium borate based on the silica.

In the rubber composition of the present invention, a reaction between silica and the silane coupling agent is accelerated during kneading, and gas is little produced during the subsequent processing steps, so that blisters are inhibited from being produced at an extruding step. This can improve a dimensional stability of the extruded product and elevate the extrusion processing speed. Further, sodium borate have no detrimental effect on the processability such as a Mooney viscosity and scorch time and the reinforcing properties such as a tensile strength and an elastic modulus, and hence an industrially very useful rubber composition and a production process for the same are provided.

DETAILED DESCRIPTION OF THE PREFERRED EMBODIMENT

The embodiment of the present invention shall be explained below in detail.

The rubber composition of the present invention is characterized in that in a rubber composition containing silica and a silane coupling agent, 100 parts by weight of a rubber component comprising natural rubber and/or synthetic rubber is blended with 10 to 100 parts by weight of silica and sodium borate of 1 to 20% by weight, preferably 2 to 10% by weight based on the silica.

Natural rubber (NR) or synthetic rubber can be used alone or in a blend thereof as the rubber component used in the present invention. The synthetic rubber includes, for example, synthetic polyisoprene rubber, polybutadiene rubber (BR), styrene-butadiene rubber (SBR), butyl rubber and halogenated butyl rubber.

Synthetic silica prepared by, for example, a precipitation method can be used as the silica used in the present invention. To be specific, it includes NIPSIL AQ manufactured by Nippon Silica Ind. Co., Ltd., ULTRASIL VN3 and BV3370GR manufactured by Degussa AG., RP1165NP, Zeosil 165GR and Zeosil 175NP manufactured by Rhone Poulenc Co., Ltd., and Hisil 233, Hisil 200 and Hisil 255 manufactured by PPG Co., Ltd. (all are brand names). However, it shall not specifically be restricted.

The blending amount of the silica is 10 to 100 parts by weight per 100 parts by weight of the rubber component. If the blending amount of the silica is less than 10 parts by weight, the low fuel consumption can not sufficiently be compatible with the wet grip, and if the blending amount exceeds 100 parts by weight, the viscosity rises too much. Accordingly, both amounts are not preferred.

The silane coupling agent used in the present invention shall not specifically be restricted, but a silane coupling agent containing an alkoxy group is preferred. It includes, for example, bis(3-triethoxysilylpropyl)polysulfide, γ-mercaptopropyl trimethoxysilane, γ-mercaptopropyl triethoxysilane, γ-aminopropyl trimethoxysilane, γ-aminopropyl triethoxysilane, vinyl trimethoxysilane, vinyl triethoxysilane, γ-glycidoxypropyl trimethoxysilane, γ-glycidoxypropyl methyldiethoxysilane, 3-trimethoxysilylpropyl-N,N-dimethylcarbamoyl tetrasulfide, 3-trimethoxysilylpropyl benzothiazolyl tetrasulfide, and 3-trimethoxysilylpropyl methacrylate monosulfide.

In particular, bis(3-triethoxysilylpropyl) polysulfide provides a good balance between the dispersibility and the reinforcing property and therefore is preferred.

The blending amount of the silane coupling agent is 3 to 20% by weight, preferably 7 to 15% by weight based on the weight of the silica. If the blending amount of the silane coupling agent is less than 3% by weight, the coupling effect is small, and a poor dispersion of the silica and a reduction in the reinforcing property are brought about. On the other hand, if the blending amount exceeds 20% by weight, a gelation of the polymer increases. Accordingly, both amounts are not preferred.

In the present invention, sodium borate is blended in order to accelerate the reaction of the silica with the alkoxy group-containing silane coupling agent, and sodium borate includes, for example, sodium orthoborate ($Na_3BO_3$), sodium diborate ($Na_4B_2O_5$), sodium metaborate ($NaBO_2$), sodium tetraborate ($Na_2B_4O_7$), sodium pentaborate ($Na_4B_{10}O_{17}$), and sodium octaborate ($Na_2B_8O_{13}$).

In particular, sodium tetraborate is preferred. Sodium tetraborate is called borax in another name, and decahydrate, pentahydrate and anhydride are available. Any of them can be used to provide the effect.

Sodium tetraborate elevates a reaction efficiency between the silica and the silane coupling agent but scarcely has an effect on other properties of uncured rubber (viscosity and scorch time) and properties of cured rubber.

The blending amount of sodium borate is 1 to 20% by weight, preferably 2 to 10% by weight based on the silica. If the amount of sodium borate is less than 1% by weight, the satisfactory effect is not exerted, and if it is blended in an amount exceeding 20% by weight, the effect corresponding thereto can not be expected.

Kneading of the rubber is carried out by means of an internal mixer or a roll, which are usually used. When the internal mixer is used, kneading is carried out usually dividing into 2 or more stages; a stage for bending a filler (nonproductive mixing) and a stage for blending a vulcanizing agent (productive mixing). Sodium borate is blended preferably at the same stage that the silica is blended, which shall not be restricted, however.

The kneading temperature shall not specifically be restricted but is preferably 140° C. or higher and 180° C. or lower for accelerating the reaction of silica with the silane coupling agent, which is the object of the present invention.

In the rubber composition of the present invention, there may suitably be blended in addition to the rubber component, silica, the silane coupling agent and sodium borate, if necessary, chemicals usually used in the rubber industry such as reinforcing fillers (carbon black), softening agents, antioxidants, resins, cure agents, cure accelerators and cure activators, etc.

The rubber composition of the present invention is suited particularly to uses such as a tread of tire, and in addition thereto, it can be applied to all uses of conventional rubber compositions, for example, conveyer belts, hoses and the like.

EXAMPLES

The present invention shall be explained below in further detail with reference to examples, but the present invention shall not be restricted to these examples.

Various physical properties of rubber compositions prepared in the respective examples and comparative examples were evaluated by the following measuring methods.

(1) Production of Blisters

A compounded stock having a thickness of about 10 mm was left standing in an oven of 120° C. for 15 minutes, and then production of blisters was visually observed with eyes. A case of no production of blisters is good.

(2) Heating Loss

A loss in weight of the rubber before and after putting in an oven was determined. The smaller this value is, the more the reaction of silica with the silane coupling agent proceeds during kneading and hence the less the alcohol is produced at a processing step after kneading. Accordingly, the smaller value is preferred.

(3) Mooney Viscosity and Scorch Time

The Mooney viscosity and the scorch time were measured at 130° C. according to JIS-K6301. The smaller the value of the Mooney viscosity is, the better the processability is, and the more the extruding speed is accelerated.

The larger the value of the scorch time is, the more the scorching phenomenon is prevented, and the better the scorching stability is.

(4) Tensile Strength and 300% Elastic Modulus

A rubber sheet having a thickness of 2 mm which was vulcanized at 160° C. for 15 minutes was prepared, and it was used for measurement according to JIS-K6301.

The larger the value of the tensile strength is, the better the reinforcing property is.

The larger the value of the 300% elastic modulus is, the better the reinforcing property is.

Examples 1 to 4 and Comparative Example 1

Rubber compositions were prepared according to blending proportions shown in Table 1 to evaluate various physical properties. The results thereof are shown in Table 1.

The rubbers were kneaded by means of a 2.7 liter Banbury mixer, wherein a polymer, an oil, a filler, silica, a silane coupling agent, an antioxidant, stearic acid and sodium borate were kneaded at the first stage, and zinc oxide, a cure accelerator and sulfur were kneaded at the second stage.

The kneading conditions were:

at the first stage, the kneading time is 3 minutes and the rubber composition is discharged when the temperature reached 150° C., at the second stage, the kneading time is 1 minute or shorter and the rubber composition is discharged when the temperature reached 110° C.

TABLE 1

|  | Comparative Example 1 | Example 1 | Example 2 | Example 3 | Example 4 |
|---|---|---|---|---|---|
| SBR1712*[1] | 96.25 | 96.25 | 96.25 | 96.25 | 96.25 |
| BRO1*[2] | 30 | 30 | 30 | 30 | 30 |
| Aroma oil | 20 | 20 | 20 | 20 | 20 |
| Silica | 85 | 85 | 85 | 85 | 85 |
| Silane coupling agent*[3] | 8.5 | 8.5 | 8.5 | 8.5 | 8.5 |
| Antioxidant 6PPD*[4] | 1 | 1 | 1 | 1 | 1 |
| Stearic acid | 2 | 2 | 2 | 2 | 2 |
| Na tetraborate decahydrate |  | 1 | 3 | 6 |  |
| Na tetraborate pentahydrate |  |  |  |  | 3 |
| Zinc white | 3 | 3 | 3 | 3 | 3 |
| Cure accelerator TBBS*[5] | 1.2 | 1.2 | 1.2 | 1.2 | 1.2 |
| Cure accelerator DPG*[6] | 0.6 | 0.6 | 0.6 | 0.6 | 0.6 |
| Sulfur | 1.5 | 1.5 | 1.5 | 1.5 | 1.5 |
| Production of blisters | Present | Slight | None | None | None |
| Heating loss (%) | 0.15 | 0.12 | 0.10 | 0.09 | 0.10 |
| Mooney viscosity | 72 | 73 | 75 | 76 | 75 |
| Mooney scorch time (min.) | 18 | 18 | 17 | 17 | 17 |

TABLE 1-continued

|  | Comparative Example 1 | Example 1 | Example 2 | Example 3 | Example 4 |
|---|---|---|---|---|---|
| Tensile strength (MPa) | 17.2 | 17.2 | 17.2 | 17.1 | 17 |
| 300% elastic modulus (MPa) | 7 | 6.9 | 6.9 | 7.1 | 6.8 |

*[1]manufactured by Japan Synthetic Rubber Co., Ltd.
*[2]manufactured by Japan Synthetic Rubber Co., Ltd.
*[3]Average chain length of bis-(3-triethoxysilylpropyl)polysulfide is 2.5
*[4]Nocrack 6C manufactured by Ohuchi Shinko Chemical Co., Ltd.
*[5]Nocceler NS manufactured by Ohuchi Shinko Chemical Co., Ltd.
*[6]Nocceler D manufactured by Ohuchi Shinko Chemical Co., Ltd.

As apparent from the results summarized in Table 1, the rubber compositions blended with sodium tetraborate decahydrate are inhibited from producing blisters. Further, it can be found as well that the heating losses are small and generation of gas (presumed to be mainly ethanol) decreases. As compared with the comparative example, the Mooney viscosity goes up slightly, and the scorch time is shortened a little. However, the levels thereof shall not be problematic in actual processing.

It can be found that the tensile strengths and the 300% elastic moduli are almost the same as those of the comparative example and sodium borate exerts no any detrimental effect on the reinforcing properties for the rubber.

Further, it can be found that sodium tetraborate pentahydrate shows as well the same tendency as sodium tetraborate decahydrate and both of them accelerate a reaction between the silica and the silane coupling agent without exerting any detrimental effect on the physical properties of the rubber.

Examples 5 to 7 and Comparative Examples 2 to 4

Rubber compositions were prepared according to blending proportions shown in Table 2 to evaluate various physical properties. The results thereof are shown in Table 2. Comparison with sodium thiosulfate pentahydrate (Comparative Example 3) and tin dilaurate (Comparative Example 4) representing conventional technologies was carried out.

The same method as in the examples shown in Table 1 was used for a kneading method.

TABLE 2

|  | Comparative Example 2 | Comparative Example 3 | Comparative Example 4 | Example 5 | Example 6 | Example 7 |
|---|---|---|---|---|---|---|
| SBR1712*[1] | 82.5 | 82.5 | 82.5 | 82.5 | 82.5 | 82.5 |
| BRO1*[2] | 20 | 20 | 20 | 20 | 20 | 20 |
| Natural rubber | 20 | 20 | 20 | 20 | 20 | 20 |
| Silica | 35 | 35 | 35 | 35 | 35 | 35 |
| Silane coupling agent*[7] | 3.5 | 3.5 | 3.5 | 3.5 | 3.5 | 3.5 |
| Carbon black N330*[8] | 35 | 35 | 35 | 35 | 35 | 35 |
| Antioxidant 6PPD*[4] | 1 | 1 | 1 | 1 | 1 | 1 |
| Stearic acid | 2 | 2 | 2 | 2 | 2 | 2 |
| Na thiosulfate pentahydrate |  | 2 |  |  |  |  |
| Sn dilaurate |  |  | 2 |  |  |  |
| Na tetraborate decahydrate |  |  |  | 2 |  |  |
| Na tetraborate pentahydrate |  |  |  |  | 2 |  |
| Na tetraborate anhydride |  |  |  |  |  | 2 |
| Zinc white | 3 | 3 | 3 | 3 | 3 | 3 |
| Cure accelerator TBBS*[5] | 1.2 | 1.2 | 1.2 | 1.2 | 1.2 | 1.2 |
| Cure accelerator DPG*[6] | 0.6 | 0.6 | 0.6 | 0.6 | 0.6 | 0.6 |
| Sulfur | 1.5 | 1.5 | 1.5 | 1.5 | 1.5 | 1.5 |
| Production of blisters | Present | None | None | Slight | None | None |
| Heating loss (%) | 0.07 | 0.04 | 0.05 | 0.04 | 0.04 | 0.03 |
| Mooney viscosity | 78 | 102 | 89 | 79 | 79 | 80 |

TABLE 2-continued

|  | Comparative Example | | | Example | | |
| --- | --- | --- | --- | --- | --- | --- |
|  | 2 | 3 | 4 | 5 | 6 | 7 |
| Mooney scorch time (min.) | 16 | 3 | 19 | 16 | 15 | 15 |
| Tensile strength (MPa) | 22 | 22.2 | 21.7 | 22.3 | 22.1 | 22 |
| 300% elastic modulus (MPa) | 9.5 | 12.3 | 9 | 9.4 | 9.5 | 9.5 |

*[1]manufactured by Japan Synthetic Rubber Co., Ltd.
*[2]manufactured by Japan Synthetic Rubber Co., Ltd.
*[4]Nocrack 6C manufactured by Ohuchi Shinko Chemical Co., Ltd.
*[5]Noceller NS manufactured by Ohuchi Shinko Chemical Co., Ltd.
*[6]Noceller D manufactured by Ohuchi Shinko Chemical Co., Ltd.
*[7]Average chain length of bis-(3-triethoxysilylpropyl)polysulfide is 4
*[8]manufactured by Asahi Carbon Co., Ltd.

As shown in the results summarized in Table 2, it can be found that the rubber compositions blended with sodium borate are inhibited from producing blisters without exerting a large effect on the physical properties of the rubber and that the heating losses are reduced and a reaction between the silica and the silane coupling agent is accelerated.

In contrast with this, the scorch time is notably reduced in Comparative Example 3 in which sodium thiosulfate pentahydrate was blended, and the Mooney viscosity goes up in Comparative Example 4 in which tin dilaurate was blended. Both of them are degraded in processability and unsuitable as rubber compositions.

What is claimed is:

1. A silica-blended rubber composition comprising 100 parts by weight of sulfur-vulcanizable rubber blended with 10 to 100 parts by weight of silica, 3 to 20% by weight of a silane coupling agent having an alkoxysilyl group based on the silica and 1 to 20% by weight of a sodium borate based on the silica.

2. The silica-blended rubber composition as described in claim 1, wherein sodium borate is sodium tetraborate.

3. The silica-blended rubber composition as described in claim 1, wherein the alkoxysilyl group is an ethoxysilyl group.

4. The silica-blended rubber composition as described in claim 3, wherein the silane coupling agent is bis-(3-triethoxysilylpropyl)polysulfide.

5. A tire comprising a tread, wherein the tread comprises the silica-blended rubber composition of claim 1.

\* \* \* \* \*